United States Patent [19]
Tsukada et al.

[11] Patent Number: 5,458,526
[45] Date of Patent: Oct. 17, 1995

[54] METHOD OF SLICING A SEMICONDUCTOR WAFER AND AN APPARATUS

[75] Inventors: Shuichi Tsukada; Takeshi Doi, both of Mitaka, Japan

[73] Assignee: Tokyo Seimitsu Co., Ltd., Tokyo, Japan

[21] Appl. No.: 65,755

[22] Filed: May 24, 1993

[30] Foreign Application Priority Data

May 25, 1992 [JP] Japan ................................. 4-132678

[51] Int. Cl.⁶ .......................... B24B 49/10; B24B 49/08
[52] U.S. Cl. ............................... 451/5; 451/41; 125/13.02
[58] Field of Search ........................... 125/13.02, 13.01, 125/23.01; 51/283 R, 266, 73 R, 165.71, 165.9; 451/41, 449, 180, 5, 24

[56] References Cited

U.S. PATENT DOCUMENTS

| | | | |
|---|---|---|---|
| 3,327,696 | 6/1967 | Aiken et al. | 125/13.01 |
| 5,025,593 | 6/1991 | Kawaguchi et al. | 125/13.02 |
| 5,313,741 | 5/1994 | Toyama | 125/13.02 |

FOREIGN PATENT DOCUMENTS

| | | |
|---|---|---|
| 0456223 | 11/1991 | European Pat. Off. |
| 0476952 | 3/1992 | European Pat. Off. |
| 0513437 | 11/1992 | European Pat. Off. |
| 3908153 | 9/1989 | Germany. |
| 61-47644 | 3/1986 | Japan. |
| 63-134206 | 6/1988 | Japan. |
| 1-206006 | 8/1989 | Japan. |
| 3-221410 | 9/1991 | Japan. |
| 3-221411 | 9/1991 | Japan. |

*Primary Examiner*—Robert A. Rose
*Attorney, Agent, or Firm*—Sixbey, Friedman, Leedom & Ferguson; David S. Safran

[57] ABSTRACT

The present invention aims at proposing a method of slicing a semiconductor wafer and an apparatus therefor which can manufacture a bowl-shaped wafer. When the blade displacement is detected with the sensor 32, the displacement value of the blade 14 to the outer peripheral edge of the ingot 18 is obtained by the control unit 26. The air pad 30 is moved under controlling the air pressure control device 36 by the control unit 26 to make the blade displacement at the outer peripheral edge zero. As a result of this, the displacement of the wafer at the outer peripheral edge becomes zero, so that a bowl-shaped wafer can be manufactured.

5 Claims, 9 Drawing Sheets

CYLINDRICAL-SHAPED WAFER

SADDLE-SHAPED WAFER

BOWL-SHAPED WAFER

METHOD OF SLICING A SEMICONDUCTOR WAFER AND AN APPARATUS

BACKGROUND OF THE INVENTION

1. Field of the Invention

The present invention relates to a method of slicing a semiconductor wafer and an apparatus therefor, in particular, to a method of slicing a semiconductor wafer and an apparatus therefor in which a bowl-shaped wafer can be manufactured.

2. Description of the Related Art

A blade tip portion of an inner peripheral cutting edge or an outer peripheral cutting edge is composed of fine diamond grains. The blade tip is abraded partially by use. A cutting curve in either direction is drawn according to this partial abrasion. For instance, when a cutting blade is curved upward by the abrasion, a shape of a wafer is curved more upward according to a increase in a cutting resistance as cutting progresses, so that the curving displacement of the upper side becomes the maximum because the cutting resistance is made maximum at the maximum cutting length. When the cutting is further progressed, the cutting resistance becomes small according as a cutting length gradually becomes small, so that the curving displacement becomes also small gradually.

The above-mentioned method of slicing has a problem in that a wafer is worked in a shape curved upward or downward. Conventionally, a curving control of the wafer is executed to eliminate the problem. That is, the blade displacement is detected with a sensor, and the curving control is performed in such a manner that the blade displacement at the position of this sensor becomes zero by moving the air pad. In another conventional curving control, an air pad is moved in a manner that the displacement of the center part at the cutting position of a semiconductor material becomes zero, and the semiconductor material is cut.

However, the conventional method of slicing has a disadvantage in that a wafer is formed like a part of cylinder or a saddle as shown in FIGS. 4 (A) and (B) because the air pad is controlled in such a manner that the blade displacement of a sensor position or a center position becomes zero.

The wafer forming a part of cylinder and the saddle-shaped wafer are disadvantageous for the postprocessing of the wafer unlike a bowl-shaped wafer shown in FIG. 5.

SUMMARY OF THE INVENTION

The present invention aims at proposing a method of slicing a semiconductor wafer and an apparatus therefor which can manufacture a bowl-shaped wafer.

To achieve the above-mentioned purpose, a method of slicing a semiconductor wafer and an apparatus therefor, wherein a cutting edge is mounted on a rotatable spindle, a semiconductor material is pressed on the cutting edge, either one of the cutting edge and the semiconductor material is moved in a manner to relatively approach the other, and the semiconductor material is cut into thin pieces, said method comprising the steps of sensing an axial displacement of the cutting edge by a sensor and cutting the wafer while correcting the displacement by an air pad, characterized in that said air pad is controlled in such a manner that the displacement value of the cutting edge at the circumferential edge of the wafer to be cut becomes zero from the positional relationship between said sensor and said air pad to the circumferential edge to be cut out of the semiconductor material, this edge is changeable during the cutting.

According to this invention the movement value of the air pad is decided in such a manner that blade displacement at the circumferential edge of the wafer to be cut becomes zero from the positional relationship between said sensor and said air pad to the changeable cutting position, so that the displacement of the wafer to be cut at each cutting position of semiconductor material can be adjusted to zero. Therefore, a bowl-shaped wafer can be manufactured.

BRIEF DESCRIPTION OF THE DRAWING

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of a method of slicing a semiconductor wafer and an apparatus therefor according to the present invention with reference to the accompanying drawings.

Figure 1:
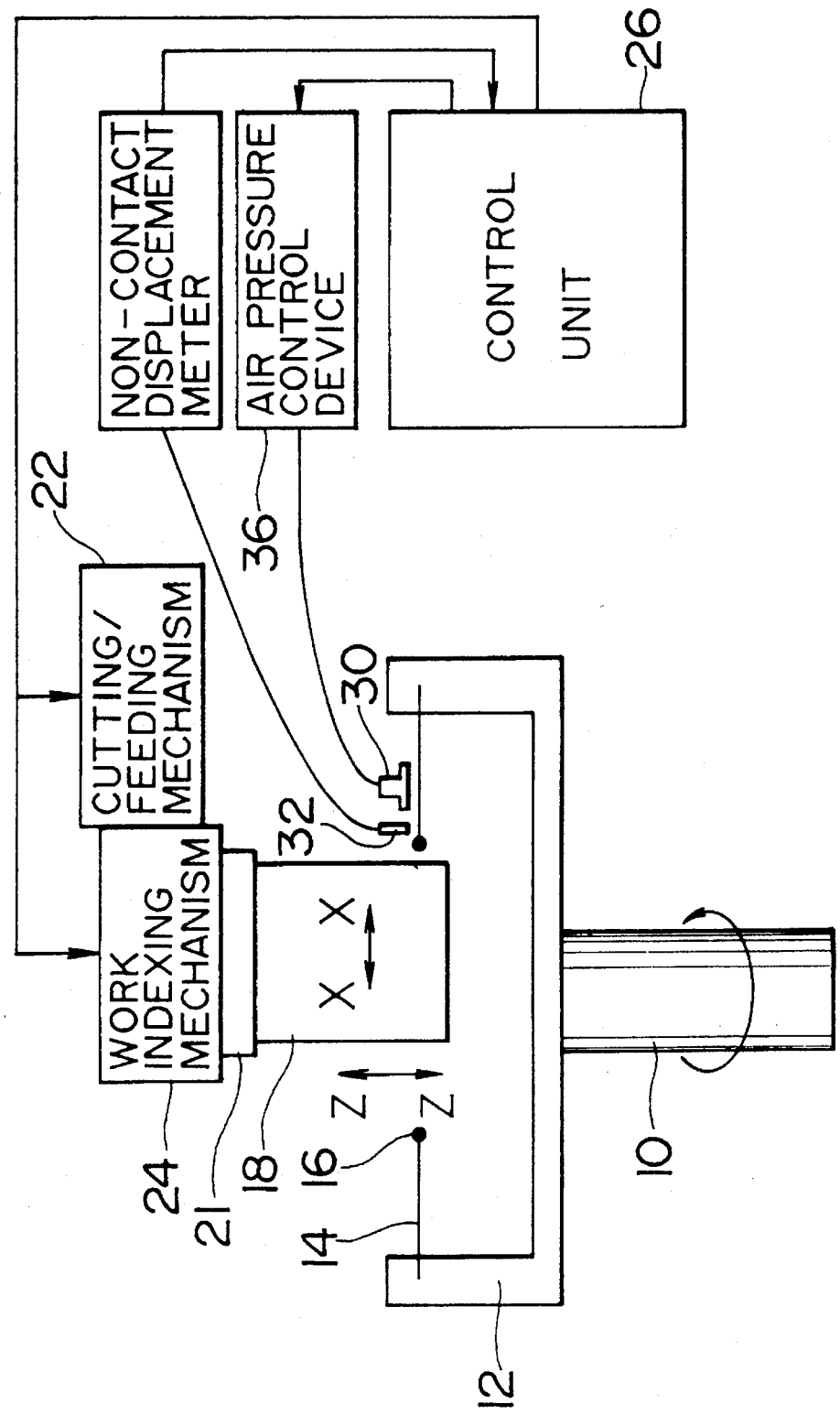
FIG. 1 is a schematic front view of a slicing machine according to the invention.

Referring to FIG. 1, a chuck body 12 is firmly secured to the upper end portion of a spindle 10, while the lower end portion of a spindle 10 is connected a motor (which is not shown). The spindle 10 and the chuck body 12 can be rotated by means of the motor.

The outer peripheral edge of a doughnut-shaped blade 12 is stretched up onto the chuck body 12. The blade 14 includes an inner peripheral cutting edge 16 along the inner peripheral cutting edge portion thereof. The inner peripheral cutting edge 16 is made up fine diamond grains and the like. The blade 14 is also arranged such that the tension of the outer peripheral edge thereof can be adjusted by a well known stretching mechanism (not shown) provided in the chuck body 12.

The upper end portion of a semiconductor ingot 18 is secured fixedly to a work support base 21. The ingot 18 can be moved in a cutting/feeding direction (that is, a direction of X—X) with a cutting/feeding mechanism 22 and the work support base 21 can be moved in the work indexing direction (that is, a direction of Z—Z) with a work indexing mechanism 24. The cutting/feeding mechanism 22 and the work dividing mechanism 24 are driven by instruction signals from a control unit 26.

Figure 2:
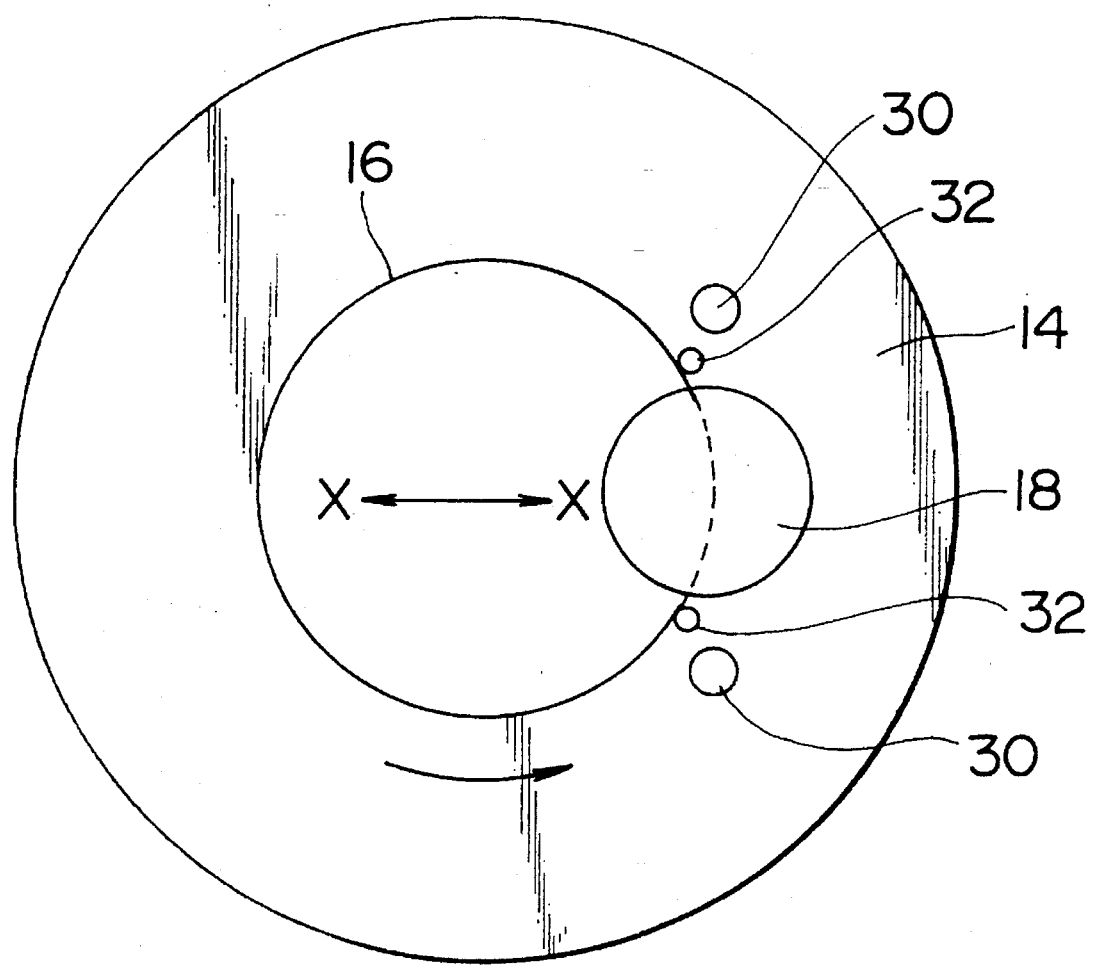
FIG. 2 is a schematic plane view of a slicing machine according to the invention.

Further, as shown in FIGS. 1 and 2, a pair of air pads 30, 30 of a non-contact type and a pair of blade sensors 32, 32 are arranged on the upper surface of the blade 14. The displacement of the blade 14 is detected with the blade sensors 32, 32 and can be corrected with the air pads 30, 30. Further, the blade sensor 32, 32 are connected with the control unit 26. The control unit 26 controls a air pressure control device 36 to move the air pads 30, 30.

By use of the slicing machined constructed in the above mentioned manner, a slicing method according to the present invention can be effected in the following manner.

Figure 3:
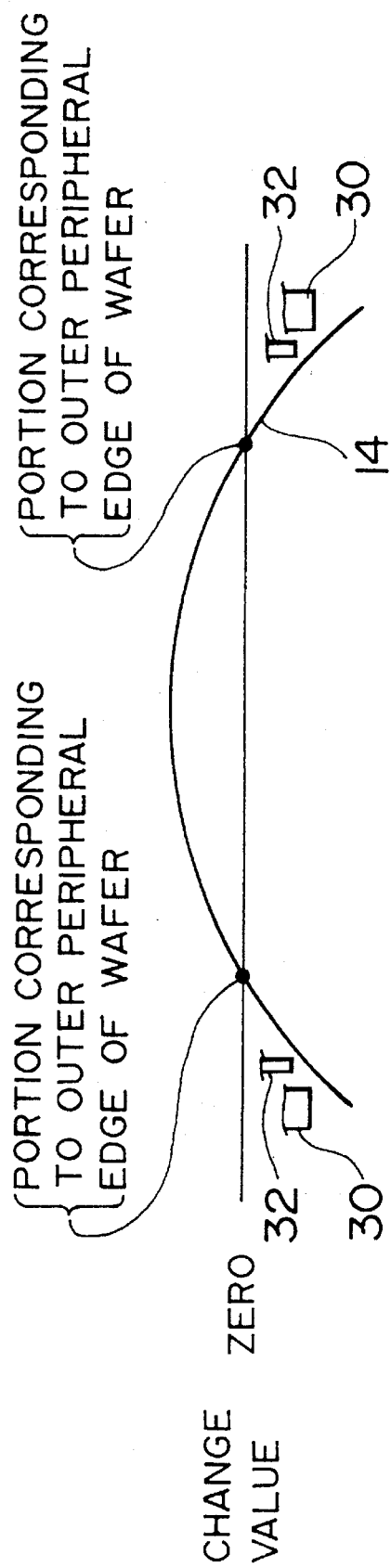
FIG. 3 is an explanatory view of showing a partial displacement of an inner peripheral cutting edge.
Figure 4A:
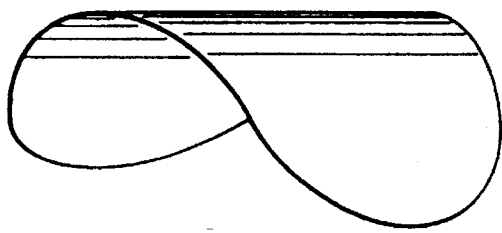
FIGS. 4 (A) and (B) are explanatory views of a wafer manufactured by the conventional method of slicing.
Figure 4B:
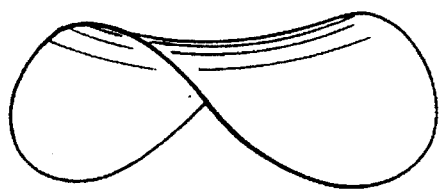
Figure 5:
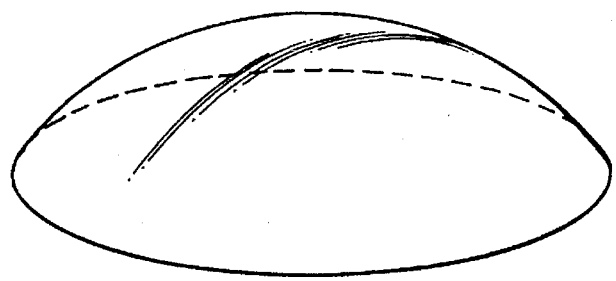
FIG. 5 is an explanatory view of a wafer manufactured by the method of slicing according to the invention.
Figure 6:
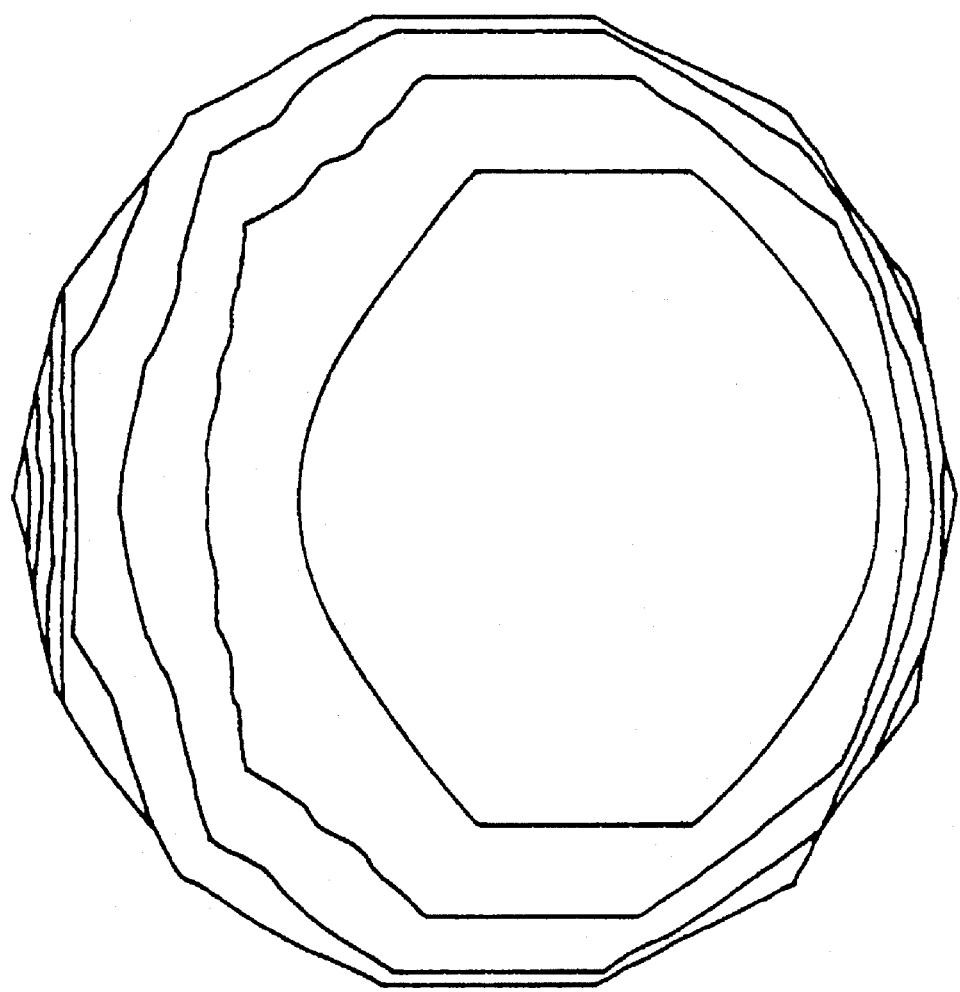
FIG. 6 is a contour-lined shape view of a wafer manufactured by the conventional method of slicing.
Figure 7:
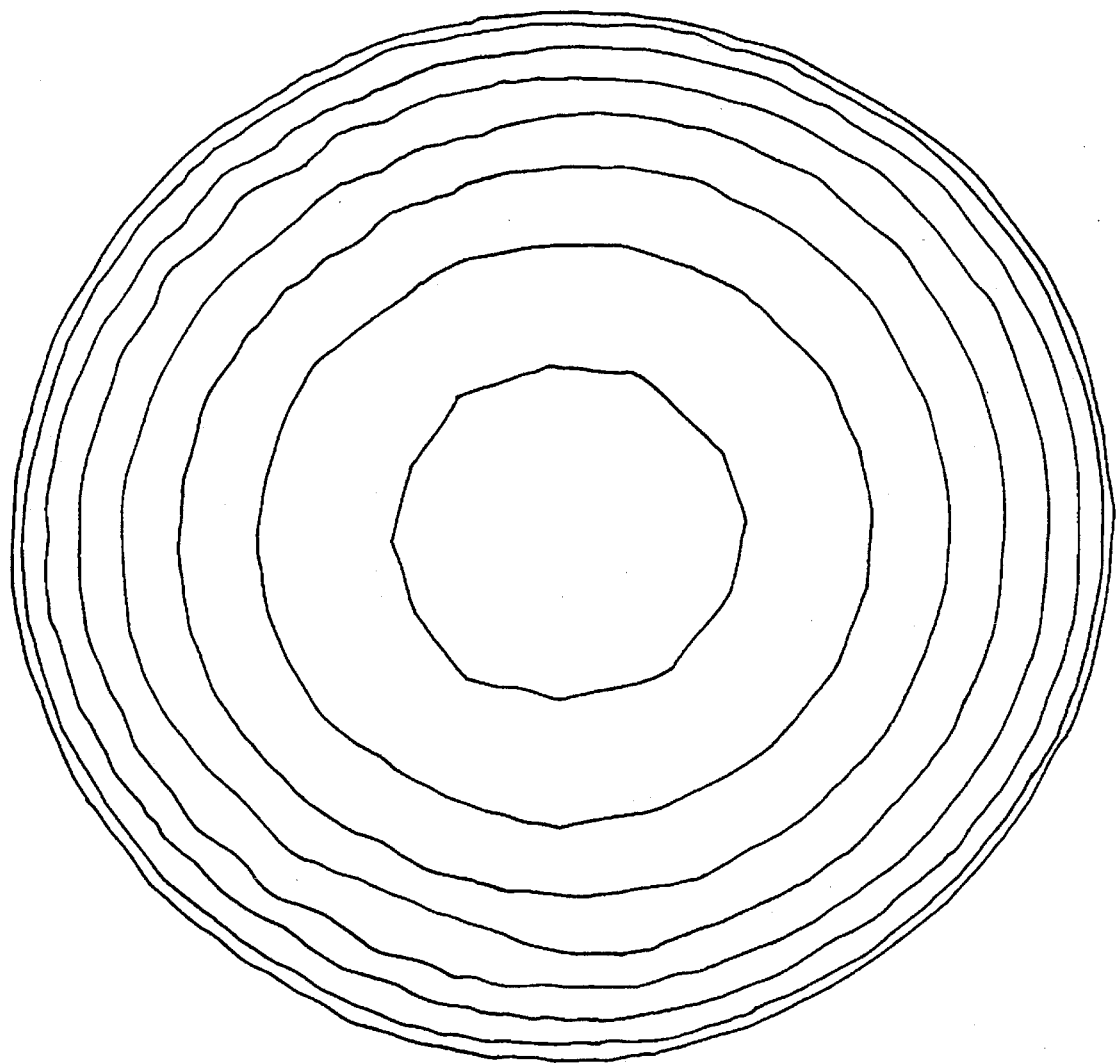
FIG. 7 is a contour-lined shape view of a wafer manufactured by the method of slicing according to the invention.
Figure 10:
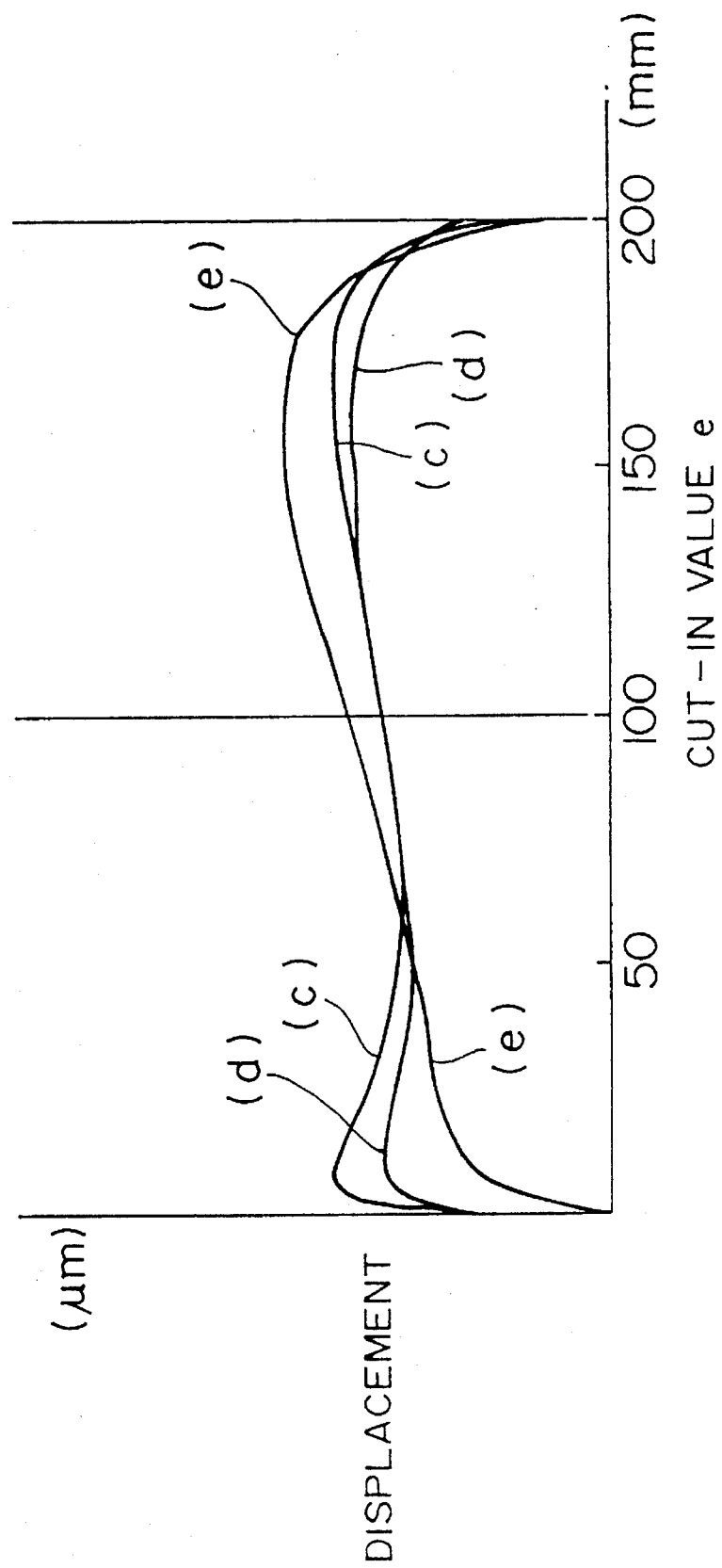

At first, the ingot 18 is moved in the direction of X aiming at the inner peripheral cutting edge 16, and then cutting is started. Generally, the relationship between the cutting resistance, the cutting length and the ingot delivery speed are that the cutting resistance increases in proportion as the cutting length becomes longer and as the ingot delivery speed becomes higher. Moreover, when the cutting resistance increases, it is in the nature that the displacement of the blade 12 becomes larger and the blade 12 becomes to curve easily. When the sensor 32 detects the displacement of the blade 14 as shown in FIG. 3, the air pad 30 is controlled in curve according to the curve (c) shown in FIG. 10, which indicates the control relationship between the displacement value and the cut-in value of the blade 14 at the position of the sensor 32 in such a manner that the displacement of the circumferential edge of the semiconductor material to be cut becomes zero from the relationship of the cutting position, the position of the sensor 32, the position of the air pad 30 and the blade displacement value which the sensor 32 detects. Incidentally, the curve (c) in FIG. 10 is described later.

Figure 8:
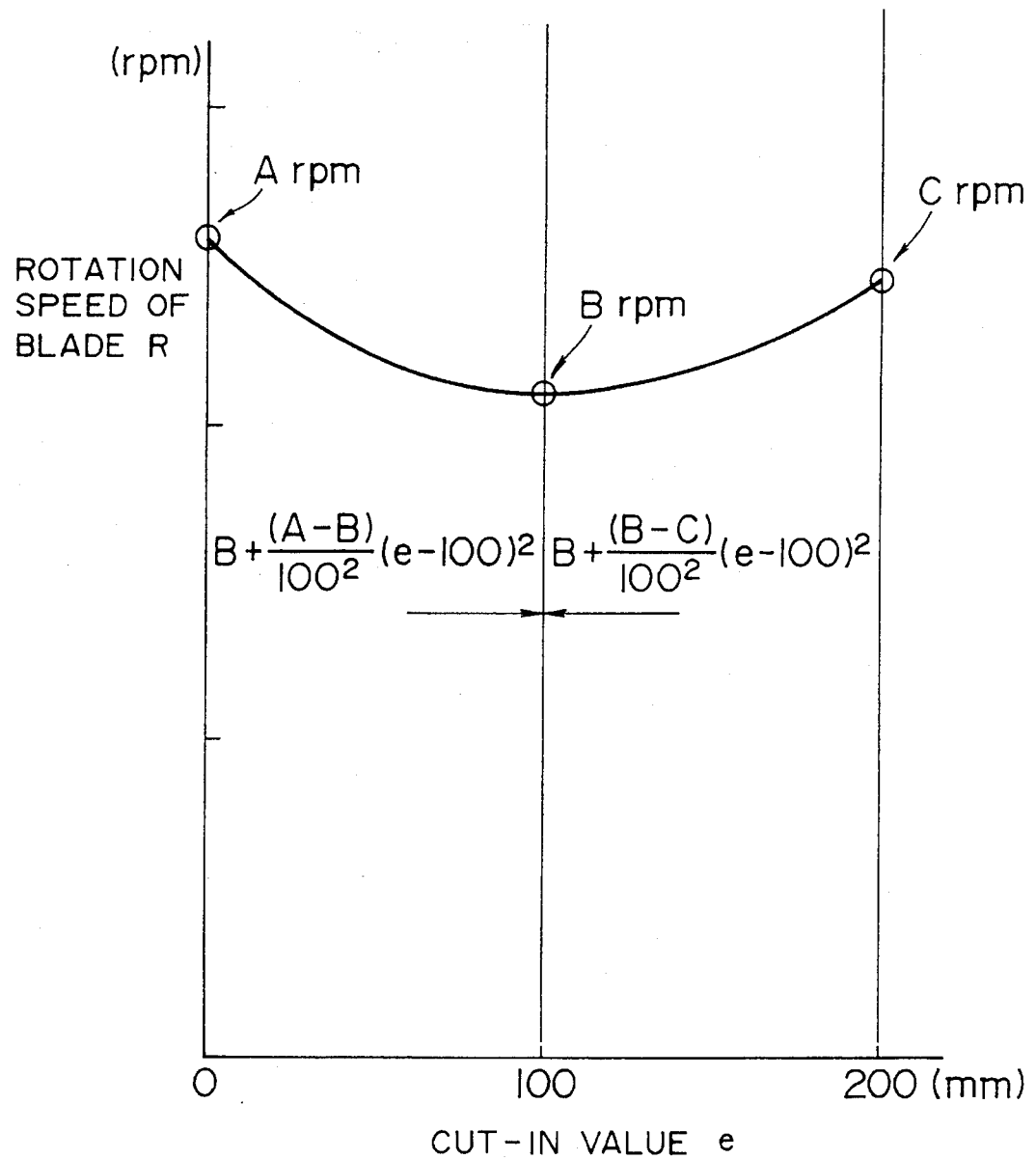
FIG. 8 is a control curve of rotational speed of a blade according to the invention.
Figure 9:
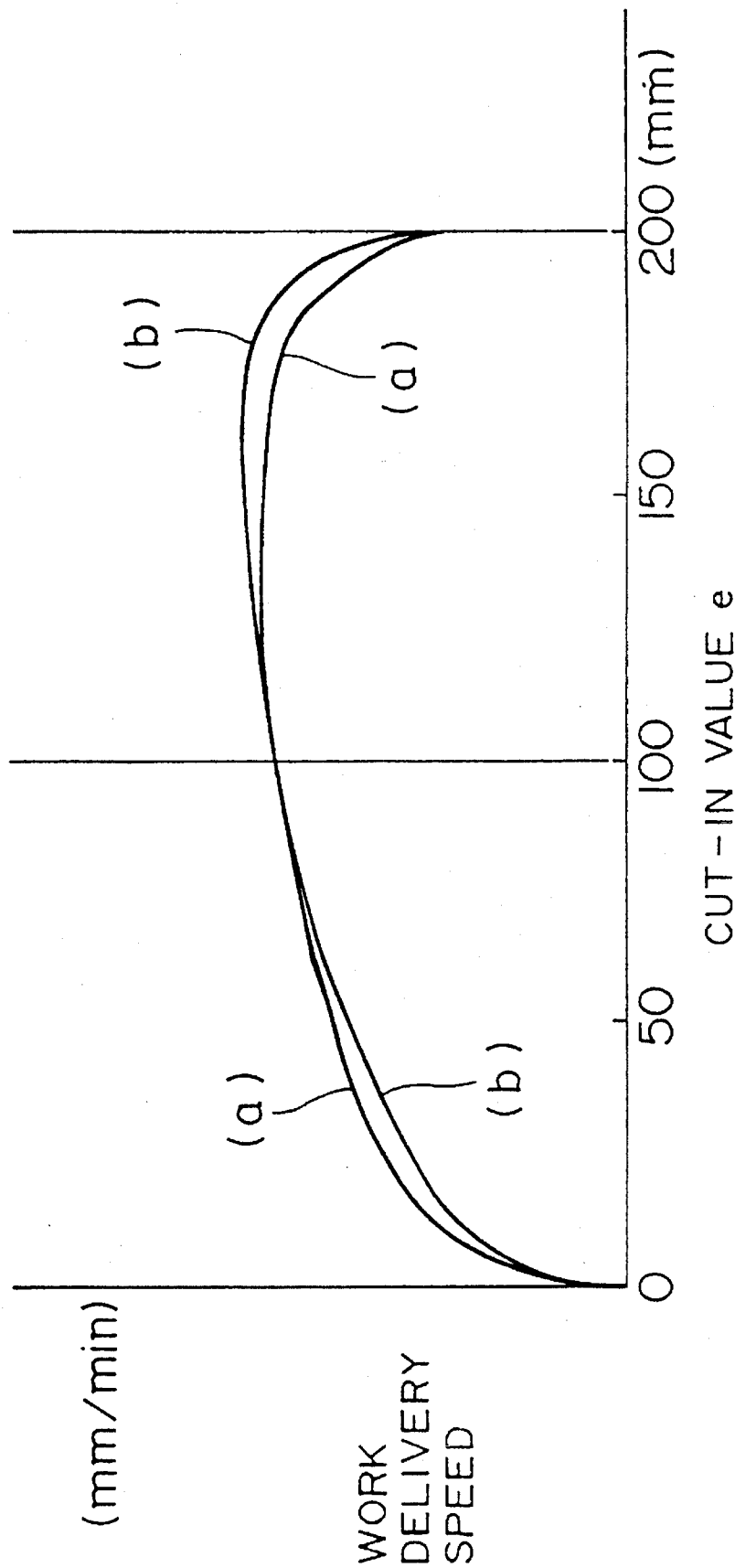
FIG. 9 is a control curve of a relationship between work delivery speed and cut-in value according to the invention; and, FIG. 10 is a control curve of a relationship between blade displacement at a position of a blade sensor and cut-in value according to the invention.

Here are the following three examples to control more accurately. FIGS. 8–10 are described to explain these examples.

First, a curve in FIG. 8 indicates the relationship between the blade rotation speed R and the cut-in value e, the maximum value of the cut-in value is 200 mm. Here, the blade rotation speed R is expressed by the following formulas;

$$R = B + \frac{(A - B)}{100^2} (e - 100)^2 \ (e \leq 100) \quad (1)$$

$$R = B + \frac{(C - B)}{100^2} (e - 100)^2 \ (100 < e \leq 200) \quad (2)$$

when e=cut-in value of workpiece (mm)

$e_{min}$=0 mm $e_{max}$=200 mm

A=blade rotation speed (rpm) (e=0 mm)

B=blade rotation speed (rpm) (e=100 mm)

C=blade rotation speed (rpm) (e=100 mm).

Curves in FIG. 9 indicate the relationship between the work delivery speed and the cut-in value to make the displacement on the center line of the wafer an oval when the outer peripheral displacement of the wafer is controlled to be zero. A curve (a) indicates a case that the blade rotation speed is not controlled. A curve (b) indicates a case that the blade rotation speed is controlled.

Moreover, curves FIG. 10 indicate the relationship between the blade displacement and the cut-in value at the position of the sensor when the outer peripheral displacement of the wafer is controlled to be zero. A curve (c) indicates a case that both the blade rotation speed and the work delivery speed are not controlled. A curve (d) indicates a case that the blade rotation speed is controlled but the work delivery speed is not controlled. A curve (e) indicates a case that the work delivery speed is controlled regardless whether the blade rotation speed is controlled or not.

In the first example, the curving control is performed by the blade rotation speed control shown in FIG. 8, the work delivery speed control indicated by the curve (b) in FIG. 9 and the blade displacement control indicated by the curve (e) in FIG. 10.

Next, in the second example, the curving control is performed by the work delivery speed control indicated by the curve (a) in FIG. 9 and the blade displacement control indicated by the curve (e) in FIG. 10.

Further, in the third example, the curving control is performed by the blade rotation speed control shown in FIG. 8 and the blade displacement control indicated by the curve (d) in FIG. 10.

As a result of this, when the ingot 18 is cut at each cutting position under the curving control, the displacement of the circumferential edge of the inner peripheral cutting edge 16 to the ingot 18 becomes zero, so that a bowl-shaped wafer can be manufactured.

In the above-mentioned embodiment, the displacement of the blade 4 is detected with a pair of sensors 32, 32 to perform the curving control. However, it is not limited to this. That is, the blade displacement of the center of the cutting position is detected with a eddy-current sensor provided at the center of the cutting position. Then, the displacement of the wafer circumferential edge may be found by the blade displacement.

As has been described heretofore, in a method of slicing a semiconductor wafer and an apparatus therefor according to the invention, the cutting blade displacement value at the circumferential edge of the semiconductor material to be cut is obtained by the cutting blade displacement value detected with the sensor and the air pads control the displacement at the circumferential edge of the semiconductor wafer, so that a bowl-shaped wafer can be manufactured.

It should be understood, however, that there is no intention to limit the invention to the specific forms disclosed, but on the contrary, the invention is to cover all modifications, alternate constructions and equivalents falling within the spirt and scope of the invention as expressed in the appended claims.

What is claimed is:

1. A method of slicing a semiconductor wafer, wherein a cutting edge is mounted on a rotatable spindle, a semiconductor material is pressed on the cutting edge, the cutting edge and the semiconductor material are moved one relative to the other in a manner causing them to come closer together, and the semiconductor material is cut into thin pieces, said method comprising the steps of sensing an axial displacement of the cutting edge by a sensor and cutting the wafer while correcting the displacement by an air pad, characterized in that, for producing a bowl-shaped wafer, said air pad is controlled in such a manner that the displacement value of the cutting edge at the circumferential edge of the wafer to be cut becomes zero from the positional relationship between said sensor and said air pad relative to the circumferential edge of the semiconductor material to be cut, which edge is changeable during the cutting.

2. The method of slicing a semiconductor wafer as set forth in claim 1, wherein said air pad is controlled in such a manner that the displacement value of the cutting edge at the circumferential edge of the wafer to be cut becomes zero by the rotational speed control of said cutting edge, the delivery speed control of said semiconductor material and the displacement value control of said cutting edge at the position of said sensor.

3. The method of slicing a semiconductor wafer as set forth in claim 1, wherein said air pad is controlled in such a manner that the displacement value of the cutting edge at the circumferential edge of the wafer to be cut becomes zero by the delivery speed control of said semiconductor material and the displacement value control of said cutting edge at the position of said sensor.

4. The method of slicing a semiconductor wafer as set forth in claim 1, wherein said air pad is controlled in such a manner that the displacement value of the cutting edge at the circumferential edge of the wafer to be cut becomes zero by the rotational speed control of said cutting edge and the displacement value control of said cutting edge at the position of said sensor.

5. An apparatus for slicing a semiconductor wafer, wherein a cutting edge is mounted on a rotatable spindle, a semiconductor material is pressed on the cutting edge, the cutting edge and the semiconductor material are moved to relatively one relative to the other in a manner causing them to come closer together, and the semiconductor material is cut into thin pieces, said apparatus comprising a sensor for sensing an axial displacement of the cutting edge by a sensor and an air pad for correcting the displacement, and means for establishing a control relationship between the axial displacement of the blade and a cut-in distance value of the blade relative to the semiconductor material, characterized in that said apparatus further comprises a control system for controlling said air pad in such a manner that the displacement value of the cutting edge at the circumferential edge of the wafer to be cut becomes zero from the positional relationship between said sensor and said air pad relative to the circumferential edge of the semiconductor material to be cut, which edge is changeable during the cutting, based upon the control relationship established by said means for establishing, as a means for producing a bowl-shaped wafer.

* * * * *